(12) United States Patent
Günther et al.

(10) Patent No.: US 11,108,112 B2
(45) Date of Patent: Aug. 31, 2021

(54) BATTERY HOUSING

(71) Applicant: Kirchhoff Automotive Deutschland GmbH, Attendorn (DE)

(72) Inventors: Alexander Günther, Olpe (DE); Volker Tölle, Plettenberg (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 216 days.

(21) Appl. No.: 16/329,474

(22) PCT Filed: Oct. 12, 2017

(86) PCT No.: PCT/EP2017/076125
§ 371 (c)(1),
(2) Date: Feb. 28, 2019

(87) PCT Pub. No.: WO2018/082898
PCT Pub. Date: May 11, 2018

(65) Prior Publication Data
US 2019/0259994 A1    Aug. 22, 2019

(30) Foreign Application Priority Data
Nov. 2, 2016 (DE) .......................... 102016120850.7

(51) Int. Cl.
*H01M 50/20* (2021.01)
*B60L 50/64* (2019.01)
(Continued)

(52) U.S. Cl.
CPC ............. *H01M 50/20* (2021.01); *B60L 50/64* (2019.02); *H01M 50/258* (2021.01); *H01M 50/147* (2021.01); *H01M 2220/20* (2013.01)

(58) Field of Classification Search
CPC .......... H01M 2220/20; H01M 2/0245; H01M 2/043; H01M 2/1077; B60L 50/64; Y02E 60/10; Y02T 10/70
See application file for complete search history.

(56) References Cited

U.S. PATENT DOCUMENTS

2011/0143179 A1*  6/2011  Nakamori  ...........  H01M 2/1083
                                                          429/99
2012/0103714 A1*  5/2012  Choi  .....................  B60L 3/0046
                                                          180/68.5
(Continued)

FOREIGN PATENT DOCUMENTS

CN         104900825 A       9/2015
CN         105098113 A      11/2015
(Continued)

OTHER PUBLICATIONS

International Search Report dated May 11, 2018 in parent International application PCT/EP2017/076125.
(Continued)

*Primary Examiner* — Adam A Arciero
(74) *Attorney, Agent, or Firm* — Polson IP Law, PC; Margaret Polson; Christopher Sylvain

(57) ABSTRACT

A battery housing for an electric-motor-driven vehicle comprising a tub part. The tub part has a bottom, side walls formed thereon, and an assembly flange which protrudes outward from the side walls. The assembly flange of at least one side wall reaches the maximum width thereof only in some sections. In contrast, the assembly flange has only a reduced width in the other sections. In addition, the battery housing comprises at least two tub parts, which are brought into engagement by means of the assembly flanges thereof facing each other.

20 Claims, 4 Drawing Sheets

(51) Int. Cl.
  *H01M 50/258* (2021.01)
  *H01M 50/147* (2021.01)

(56) References Cited

U.S. PATENT DOCUMENTS

| | | | |
|---|---|---|---|
| 2015/0340671 A1* | 11/2015 | Subramanian | B60L 58/26 429/97 |
| 2018/0062128 A1 | 3/2018 | Günther | |
| 2019/0036092 A1 | 1/2019 | Günther et al. | |
| 2019/0381899 A1 | 12/2019 | Günther et al. | |

FOREIGN PATENT DOCUMENTS

| | | | |
|---|---|---|---|
| DE | 112008000148 T5 | 11/2009 | |
| DE | 102015106955 A1 | 11/2015 | |
| IE | 202016102223 U1 | 5/2016 | |
| WO | 2015151866 A1 | 10/2015 | |

OTHER PUBLICATIONS

International Preliminary Report on Patentability dated Dec. 26, 2018 in parent International application PCT/EP2017/076125.
U.S. Appl. No. 16/320,060, filed Jan. 23, 2019, applicant Kirchhoff Automotive Deutschland GmbH. Per rule 609.07.
U.S. Appl. No. 16/320,207, filed Jan. 24, 2019, applicant Kirchhoff Automotive Deutschland GmbH. Per rule 609.07.
U.S. Appl. No. 16/320,063, filed Jan. 23, 2019, applicant Kirchhoff Automotive Deutschland GmbH. Per rule 609.07.
U.S. Appl. No. 16/329,47, filed Feb. 28, 2019, applicant Kirchhoff Automotive Deutschland GmbH. Per rule 609.07.
Office Action dated Jun. 2, 2021 in related Chinese application 201780063106.8.

* cited by examiner

BATTERY HOUSING

BACKGROUND

The present disclosure relates to a battery housing for an electric-motor-driven vehicle comprising a tub part with a tub part comprising a bottom, side walls formed on it and an assembly flange protruding outward from the latter, wherein the assembly flange reaches its maximum width only in a few sections along at least one side wall and in contrast thereto, the assembly flange has only a reduced width in the other sections.

Battery modules are used as power stores in electric-motor-driven vehicles such as, for example, in passenger cars, wheelbarrows or the like. Such battery modules are typically composed of a plurality of individual batteries. These batteries are so-called high-voltage batteries. There are certain requirements placed on the housing of such battery modules necessary for operating such a vehicle. It is essential that the battery module or modules are protected in the battery housing from external influences. In addition, a housing of the battery module or modules, which is sealed against a penetration of moisture, is necessary to prevent the formation of condensation inside the battery housing. Moisture penetrating into the battery chamber of the battery housing can result in a short circuit and fire in the battery module as a consequence.

DE 20 2016 102 223 U1 discloses a battery housing with a tub part and a cover part detachably connected to the tub part. Both parts have an outwardly protruding assembly flange running circumferentially on their sides facing each other. A circumferential seal is arranged between the tub part and the cover part. Both parts are fastened to one another with screw fasteners so that the interior of the battery housing is sealed.

DE 11 2008 000 148 T5 shows a structure of a set of batteries comprising a housing body which receives a battery in the form of a plurality of stacked battery cells, is constructed with an outwardly protruding assembly flange varying in its width and is furthermore constructed from a lower and an upper tub-like housing part.

In order to be able to make sufficient battery capacity available for an electrical vehicle, several tub parts are arranged to a tub part arrangement and connected to each other. The same applies to the cover parts. In such an arrangement of adjacent tub parts, adjacently arranged tub parts border one another by the outer closure of their assembly flange. In order to meet the safety requirements when using such a battery housing in a vehicle, the battery housings typically have a frame structure. Each tub part is enclosed by a part of a frame structure. The frame structure itself is composed of extruded high chamber profile sections. The latter are typically manufactured from an aluminum alloy in order to save weight. A section of the frame structure is located between two tub parts whose assembly flanges are adjacent to one another. The assembly flanges of the adjacently arranged tub parts are connected by this frame structure profile part, typically by a welding process. The assembly flanges have perforations circumferentially arranged at a given distance from each other or have fasteners at appropriate positions in order to be able to secure these tub parts to the particular cover parts.

Since the range of electrical vehicles is limited by the on-board battery capacity, the attempt is made to maximize the on-board battery volume as much as possible. However, there is usually only a defined given insertion volume available in a vehicle. Given this background, it would be desirable if the battery volume which can be received by such a tub arrangement could be enlarged without an expensive or complicated manufacturing process being necessary.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Proceeding from this background, an aspect of the present disclosure is therefore based on suggesting such an improvement.

This is achieved by a battery housing of the type described above, in which the battery housing comprises at least two tub parts which area placed in engagement by their assembly flanges which face each other.

In this battery housing, the assembly flange is designed in a special manner along at least one side. This special design is located at the side of the tub part side at which this tub part is arranged next to another tub part in the frame of a tub part arrangement. In a further embodiment, the tub part has such an assembly flange only along one side wall. Arrangements of a larger number of tube parts are provided so that the assembly flange then has this special design on two, three or even four side walls. The special design of the assembly flange resides in the fact that it reaches its maximum width only in some sections. In contrast thereto, in the other sections of the assembly flange it has only a reduced width. The assembly flanges of tub parts to be arranged adjacent to each other are constructed in a complementary manner such that the design of their assembly flange is facing each other so that the sections of a maximum width of the one assembly flange engage in appropriately reduced-in-width sections of the mounting flange of the adjacently arranged tub part. This toothing of the assembly flanges of adjacently arranged tub parts allows that each assembly flange in the sections of its maximum width can be connected to a bearing with the desired contact width. This can be, for example, a profile section of a frame structure. It is also possible to connect the assembly flanges to one another only by a connection plate.

It is sufficient for a fastening in accordance with regulations, even taking into consideration the mechanical requirements placed on the battery housing, if the maximum width of the assembly flange is not the same over its entire length along one side wall but rather only in a few sections. Since both assembly flanges of two adjacent tub parts, which flanges are to engage with one another and have such a design, the entire width of both adjacent assembly flanges is significantly reduced compared to the doubled width of the assembly flanges necessary in previous designs. The width of the sum of the two assembly flanges placed in engagement can correspond, for example, to the width of a single customary assembly flange. This reduction permits a greater design of the tub parts with the same structural volume. This measure can increase the available battery volume by approximately 7% in a 4th arrangement of tub parts in a 2×2 arrangement. This corresponds to a lengthening of range of also about 7%. In many instances tub part arrangements with distinctly more than four tub parts will be used. The battery volume gained is then correspondingly greater.

The outer closure of such an assembly flange can be designed, for example, to be wavy in the manner of a sinusoidal curve. Adjacent assembly flanges of this type have a design of the sections of the maximum width of their assembly flanges which is offset by half a wave. It is provided in another embodiment that each assembly flange has a base width over the length of the adjacent side wall carrying the assembly flange which width corresponds, for example, to one half the width of an assembly flange which does not have this special design. Projections are formed on this base width in the sections of the provided, maximum width. The assembly flange comprises recesses extending back from its base width at the positions at which the corresponding projections of the adjacent assembly flange are arranged. The projections and accordingly also the recesses are typically rounded off.

The present disclosure also results in a reduction of the empty weight at the same battery volume since the assembly surfaces which are to be engaged with each other have a lower use of material as a result.

The special outer contour of such an assembly flange can be manufactured by a trimming which follows the shaping process or takes place during it.

It is possible with the previously described embodiment to considerably reduce the number of screws used to tighten the tub parts to corresponding cover parts. Therefore, in the case of a 2×2 tub part arrangement the number of screws necessary for connecting the cover parts can be reduced from 80 to 57. This is also associated with a weight savings which is not negligible.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure is described in the following using embodiments with reference made to the attached figures. In the figures.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Figure 1:
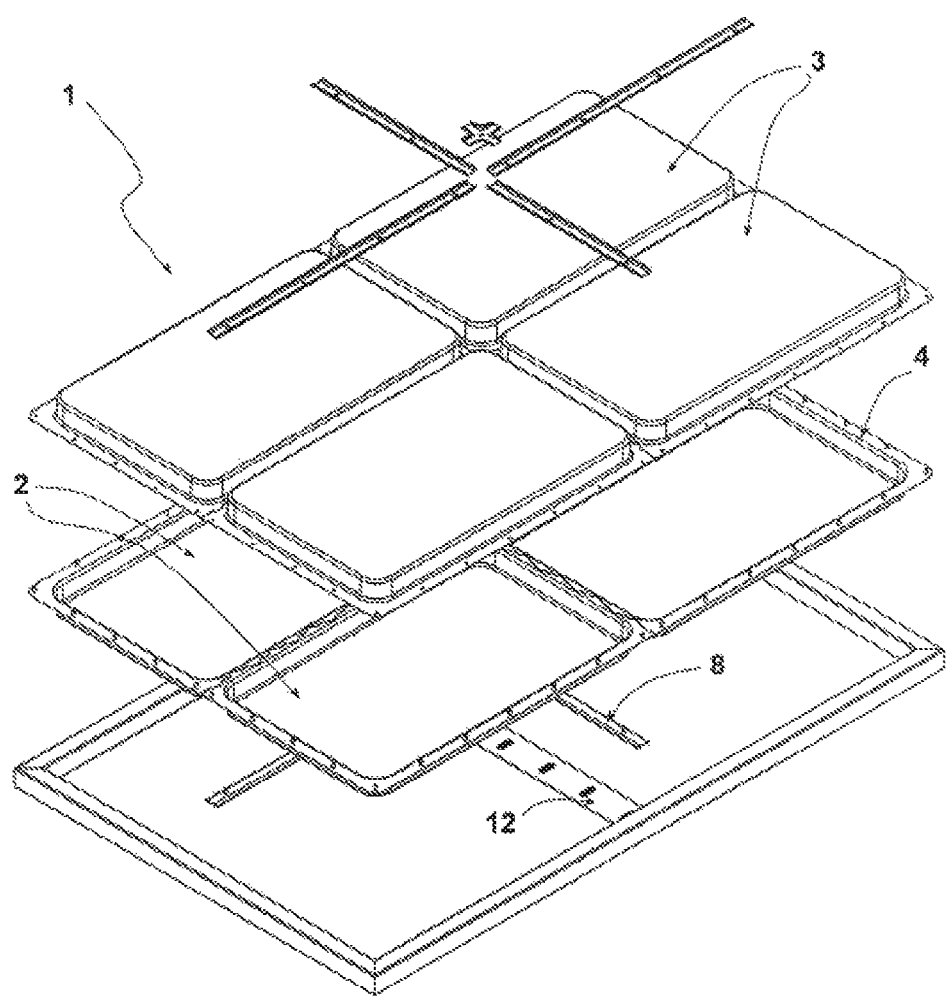
FIG. 1: shows a view in the manner of an exploded representation of a battery housing composed of several tub parts and with a frame structure.

The battery housing 1 comprises four tub parts 2 and four corresponding cover parts 3 in the exemplary embodiment shown in FIG. 1. The tub parts 2 and the cover parts 3 are designed uniformly. The tube parts 2 are described in the following. The associated embodiments apply equally to the cover parts 3.

The tub parts 2 are combined in a 2×2 arrangement in the exemplary embodiment shown. That means that each tub part 2 borders adjacent tub parts 2 with the assembly flanges along two side walls. The tub parts 2 are formed from a steel plate bar during a deep-drawing process. However, it is also possible at this point that other materials such as, for example, light metals or alloys can be used. Especially in the case of the tub parts 2, the shaping of the assembly flanges is directed to the side walls directed to the side walls of adjacent tub parts. The assembly flanges formed on the other side walls have a traditional geometry.

Figure 2:
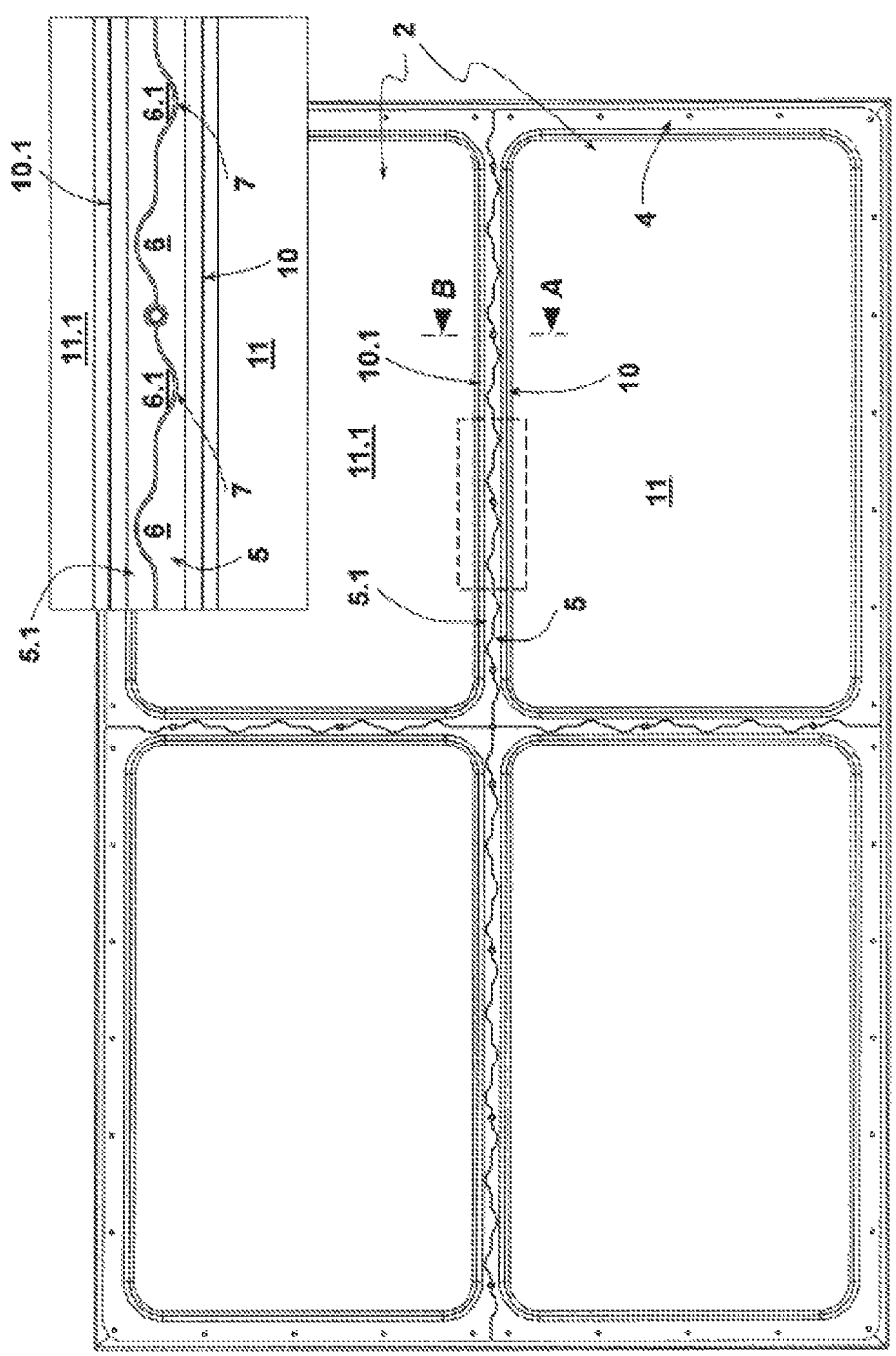
FIG. 2: shows a top view onto the lower tub parts of FIG. 1, FIG. 3: shows a partial sectional view along the line A-B of FIG. 2, and FIG. 4: shows a top view onto a tub part arrangement of a battery housing according to the prior art.

FIG. 2 shows on one of the tub parts 2 the assembly flanges with a customary design with the reference numeral 4 and those with the special design described in the following with the reference numerals 5, 5.1. The assembly flanges 5, 5.1 are toothed to each other, as is described in the following. The special design of the assembly flanges 5, 5.1 can be recognized in particular from the view of the battery housing 1 of FIG. 2 and from the enlarged partial view through the wave shape of its outer connections. The assembly flanges 5, 5.1 have their maximum width only in a few sections 6, 6.1. These sections 6, 6.1 of an assembly flange 5, 5.1 start from a base width of it which corresponds in the exemplary embodiment shown to one-half the width of the assembly flanges 4. A recess 7 also starting from the middle of the base width is located between two sections 6, 6.1 of a maximum width. A section 6.1 with a maximum width of the assembly surface 5.1 of the adjacent tub part 2 engages into this recess. The sections 6, 6.1 with the maximum width and the recesses 7 are arranged relative to each other in a correspondingly offset manner in the assembly surfaces 5, 5.1 already put in engagement with each other in the figures. The top view onto the arrangement of the tub parts 2 of FIG. 2 make it clear that the total width of the assembly surfaces 5, 5.1 engaged with each other is not greater than the width of the assembly flanges 4.

The engaged assembly flanges 5, 5.1 are connected to each other in the exemplary embodiment shown, as is apparent from FIG. 3, by a connection plate 8 arranged below the assembly surfaces 5, 5.1. The connection plate 8 has bent-up sections 9, 9.1 on the edge in order to stiffen it. The assembly flanges 5, 5.1 are connected by the connection plate in the area of their sections 6 with a maximum width by point welding to the connection plate 8, which is also manufactured from a steel sheet.

Figure 3:
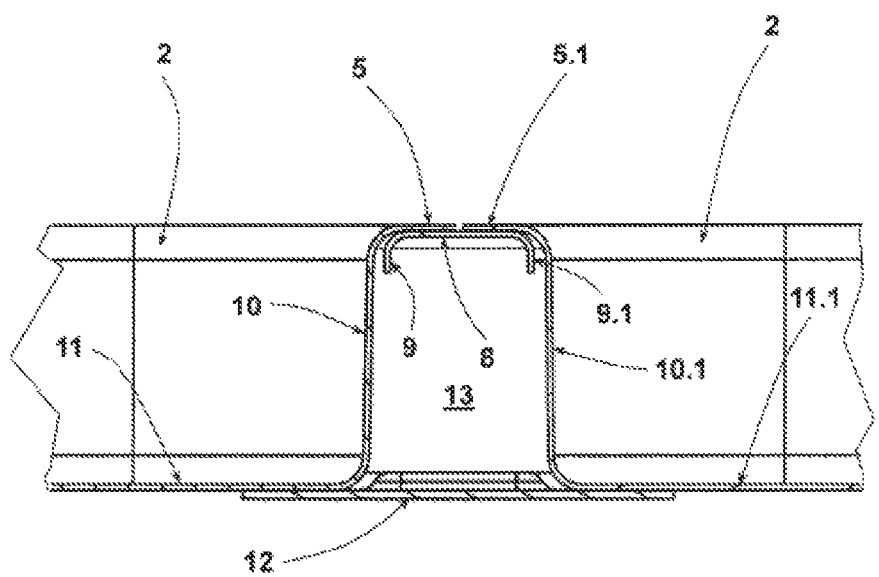

The view in FIG. 3 of the tub arrangement shows that the side walls 10, 10.1 form together with the assembly flanges 5, 5.1, which are engaged with each other, a U-shaped chamber. This chamber is closed on the bottom by a closing plate 12 which connects the two bottoms 11, 11.1 of adjacent tub parts 2. A box profile forming a hollow chamber 13 is formed in this manner In this construction, no additional hollow chamber profile is needed to realize the desired stabilization by a frame structure. Additional weight can be saved with this measure.

The reduction of the total width of the assembly flanges 5, 5.1 of adjacent tub parts 2 results in a reduction of the total size of the battery housing 1 when the tub parts 2 have the same volume. However, this reduction of the width of the assembly flanges 5, 5.1 which are engaged with each other is preferably so that the tub volume is designed to be greater with this battery housing at the same available construction volume. Such a battery housing has a larger volumetric battery capacity than a customary battery housing.

Figure 4:
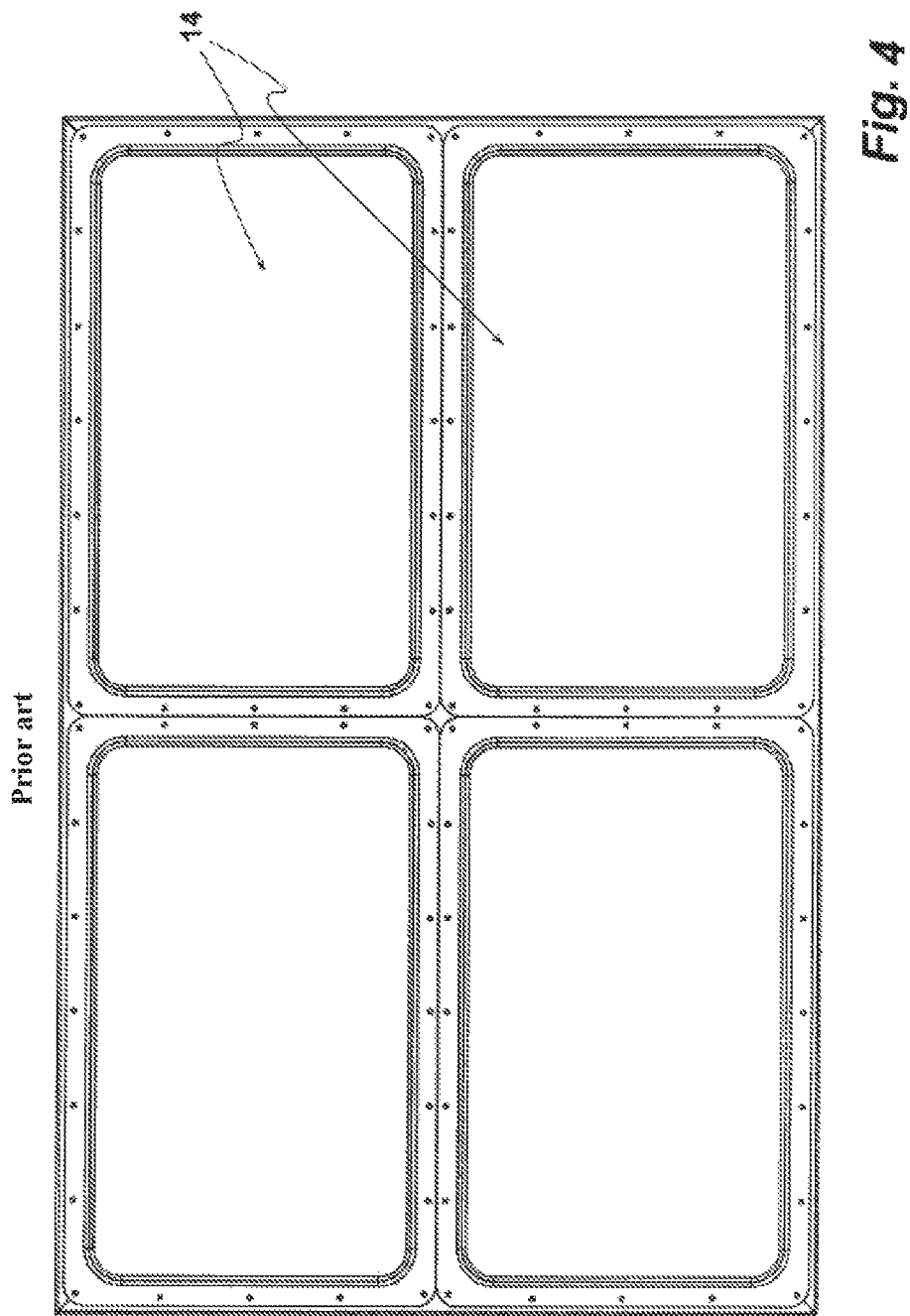

This becomes clear from a comparison of the top view of FIG. 2 with the top view of a tub part arrangement in the prior art in FIG. 4. The previously known tub parts 14 carry an assembly flange with a width that is the same circumferentially. The difference between the previously known tub part arrangement with its tub parts 14 and the tub part arrangement shown in FIG. 2 becomes clear in the distinctly reduced side wall distance of two adjacent tub parts 2 in the subject matter of the tub parts according to the present disclosure.

The invention was described using exemplary embodiments. Numerous other embodiments which can be realized by the invention result for a person skilled in the art without leaving the scope of the valid claims. While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

1 Battery housing
2 Tub part
3 Cover part
4 Assembly flange
5, 5.1 Assembly flange
6, 6.1 Section
7 Recess
8 Connection plate
9, 9.1 Turned-up edge
10, 10.1 Side wall
11, 11.1 Bottom
12 Closing plate
13 Hollow chamber
14 Tub part
15 Fastener

The invention claimed is:

1. A battery housing for an electric-motor-driven vehicle comprising:
    a tub part assembly of at least two tub parts, each of the at least two tub parts comprising a bottom, side walls formed on the bottom, and an assembly flange protruding outward from the side walls;
    wherein the at least two tub parts are arranged next to another in the tub part assembly and engaged by their assembly flanges facing each other;
    wherein each assembly flange reaches its maximum width only in a few sections along at least one side wall and in contrast thereto, the assembly flange has only a reduced width in the other sections along the at least one side wall;
    wherein the assembly flanges of adjacent tub parts facing each other are constructed in a complementary manner, such that the sections of maximum width of the assembly flange of one adjacent tub part engage in complementary sections of reduced width of the assembly flange of the other adjacent tub part; and
    wherein top surfaces of the sections of maximum width and the sections of reduced width of the assembly flanges of adjacent tubs parts form a continuous plane.

2. The battery housing of claim 1, wherein an outer closure of each assembly flange is designed as a sinusoidal curve along the at least one side wall.

3. The battery housing of claim 2, wherein the assembly flanges are connected in an area of the sections of their maximum width to a connection plate arranged on a side of the assembly flanges opposite a sealing support.

4. The battery housing of claim 3, wherein the connection plate comprises perforations for running a fastener through and/or carries several fasteners.

5. The battery housing of claim 4, wherein one of two tub parts is closed by its interconnected assembly flanges and the chamber enclosed by the side walls by a closing plate for forming a frame structure in the area of the bottoms of the tub parts.

6. The battery housing of claim 3, wherein one of two tub parts is closed by its interconnected assembly flanges and the chamber enclosed by the side walls by a closing plate for forming a frame structure in the area of the bottoms of the tub parts.

7. The battery housing of claim 1, wherein each assembly flange further comprises a base width along the at least one side wall and protrusions starting from the base width in sections of its maximum width, wherein the base width for receiving the protrusion of an assembly flange of another tub part has a recess with one-half the distance of two protrusions from one another.

8. The battery housing of claim 7, wherein the assembly flanges are connected in an area of the sections of their maximum width to a connection plate arranged on a side of the assembly flanges opposite a sealing support.

9. The battery housing of claim 8, wherein the connection plate comprises perforations for running a fastener through and/or carries several fasteners.

10. The battery housing of claim 9, wherein one of two tub parts is closed by its interconnected assembly flanges and the chamber enclosed by the side walls by a closing plate for forming a frame structure in the area of the bottoms of the tub parts.

11. The battery housing of claim 8, wherein one of two tub parts is closed by its interconnected assembly flanges and the chamber enclosed by the side walls by a closing plate for forming a frame structure in the area of the bottoms of the tub parts.

12. The battery housing of claim 1, wherein the assembly flanges are connected in an area of the sections of their maximum width to a connection plate arranged on a side of the assembly flanges opposite a sealing support.

13. The battery housing of claim 12, wherein the connection plate comprises perforations for running a fastener through and/or carries several fasteners.

14. The battery housing of claim 13, wherein one of two tub parts is closed by its interconnected assembly flanges and the chamber enclosed by the side walls by a closing plate for forming a frame structure in the area of the bottoms of the tub parts.

15. The battery housing of claim 14, wherein the closing plate is welded to the outside of the bottoms of the tub parts.

16. The battery housing of claim 14, wherein reinforcement structures are stamped into the closing plate.

17. The battery housing of claim 12, wherein one of two tub parts is closed by its interconnected assembly flanges and the chamber enclosed by the side walls by a closing plate for forming a frame structure in the area of the bottoms of the tub parts.

18. The battery housing of claim 17, wherein the closing plate is welded to the outside of the bottoms of the tub parts.

19. The battery housing of claim 17, wherein reinforcement structures are stamped into the closing plate.

20. The battery housing of claim 1, wherein the battery housing comprises, in addition to the at least two tub parts, a corresponding number of cover parts, wherein the cover parts are constructed like the tub parts.

* * * * *